United States Patent
Rabe

[11] Patent Number: 6,152,641
[45] Date of Patent: Nov. 28, 2000

[54] BALL JOINT

[75] Inventor: Jürgen Rabe, Höchstadt, Germany

[73] Assignee: Sachsenring Automobiltechnik AG, Zwickau, Germany

[21] Appl. No.: 09/269,756

[22] PCT Filed: Oct. 7, 1997

[86] PCT No.: PCT/DE97/02288

§ 371 Date: Apr. 7, 1999

§ 102(e) Date: Apr. 7, 1999

[87] PCT Pub. No.: WO98/15746

PCT Pub. Date: Apr. 16, 1998

[30] Foreign Application Priority Data

Oct. 7, 1996 [DE] Germany ............ 296 17 276 U

[51] Int. Cl.[7] .................................................. F16C 11/06
[52] U.S. Cl. .............................. 403/134; 403/50; 277/635
[58] Field of Search ........................... 403/134, 133, 403/132, 122, 135, 140, 128, 130, 131, 76, 50, 51; 277/635, 316, 924; 29/893.11

[56] References Cited

U.S. PATENT DOCUMENTS

| 2,157,401 | 5/1939 | Craver ............................ 403/131 |
| 2,819,918 | 1/1958 | Seaquist ......................... 403/134 |
| 3,279,833 | 10/1966 | Ihnacik, Jr. ................... 277/635 X |
| 3,279,834 | 10/1966 | Budzynski ...................... 277/635 X |
| 3,404,909 | 10/1968 | Gottschald ..................... 277/635 X |
| 3,547,473 | 12/1970 | Gottschald ........................ 430/134 |
| 3,598,434 | 8/1971 | Patton et al. ..................... 403/122 |
| 4,386,869 | 6/1983 | Smith ........................ 403/134 X |
| 4,527,803 | 7/1985 | Rose .......................... 403/134 X |
| 4,755,078 | 7/1988 | Blumberg et al. ................ 403/134 |
| 4,819,953 | 4/1989 | Joh ........................... 277/924 X |
| 5,312,200 | 5/1994 | Buhl et al. ..................... 403/134 |
| 5,653,545 | 8/1997 | Moormann et al. ............ 403/133 X |

FOREIGN PATENT DOCUMENTS

| 1 116 190 | 5/1956 | France . |
| 10 98 381 | 1/1961 | Germany . |
| 39 40 679 | 6/1991 | Germany . |
| 195 13 714 | 2/1996 | Germany . |
| 196 36 420 | 2/1997 | Germany . |
| 296 16 350 U | 8/1997 | Germany . |
| 817027 | 7/1959 | United Kingdom ............ 403/134 |
| 895 068 | 4/1962 | United Kingdom . |
| 954690 | 4/1964 | United Kingdom ............ 403/134 |
| 1 124 781 | 8/1968 | United Kingdom . |

Primary Examiner—Harry C. Kim
Attorney, Agent, or Firm—Nixon Peabody LLP; David S. Safran

[57] ABSTRACT

A ball joint (1) having a ball joint housing (2), a ball pivot (7) with a shaft (6) and a ball (5) connected to the shaft, the ball being pivotally mounted in a recess (3) of the ball joint housing, and an elastic seal between the shaft and the ball joint housing. The seal is a molded-on jacket (21) of an elastomer material which has been formed in situ on the shaft.

15 Claims, 2 Drawing Sheets

BALL JOINT

BACKGROUND OF THE INVENTION

Field of the Invention

This invention relates to a ball joint having a ball joint housing, preferably with attachment means on, a ball of a ball pivot which is pivotally mounted in a recess of the ball joint housing, and an elastic seal between the shaft and the ball joint housing.

In a known ball joint of this type the jacket provided as a seal consists of a collar or a bellows of natural or synthetic rubber or of thermoplastic elastomers. These collars or bellows are conically corrugated in the manner of a concertina. They are pushed over the pivots of the ball joint and fit with the edge of the larger opening under prestress into a peripheral groove of the ball joint housing. In addition, one or two solid circlips or spiral lock washers are tensioned via the collar or bellows. These clip(s) or washer(s) press the collar or bellows into the groove and thus attach it securely and tightly.

This manner of construction requires separate production, warehousing and assembly on the one side of the collar or bellows and on the other side of the ball joint body. For the circlip(s) and the spiral lock washer(s) in addition a corrosion-resistant and thus expensive material must be used. In addition, when the spiral lock washer is clamped, because of assembly the collar or the bellows is relatively frequently torn and thus a high scrap rate occurs and expensive retouch efforts are necessary.

SUMMARY OF THE INVENTION

The object of this invention is to simplify the production of ball joints of the initially mentioned type, to shorten assembly time, to cut production costs and the scrap rate. In addition the service life of these ball joints will be increased.

This object is achieved by the seal being formed of a molded-on jacket of crosslinked or non-crosslinked elastomer.

Use of the invention eliminates the necessity of separate production and warehousing of collars or bellows and the circlips and spiral lock washers since the plastic of the jacket extends into the grooves during forming and is joined by form-fit to the material of the ball joint housing. Therefore circlips or spiral lock washers are no longer needed so that they and the scrap and repairs necessitated thereby are eliminated.

Other advantageous details of the invention are given in the dependent claims and are detailed below using the embodiments illustrated in the drawings.

DETAILED DESCRIPTION OF THE INVENTION

Figure 1:
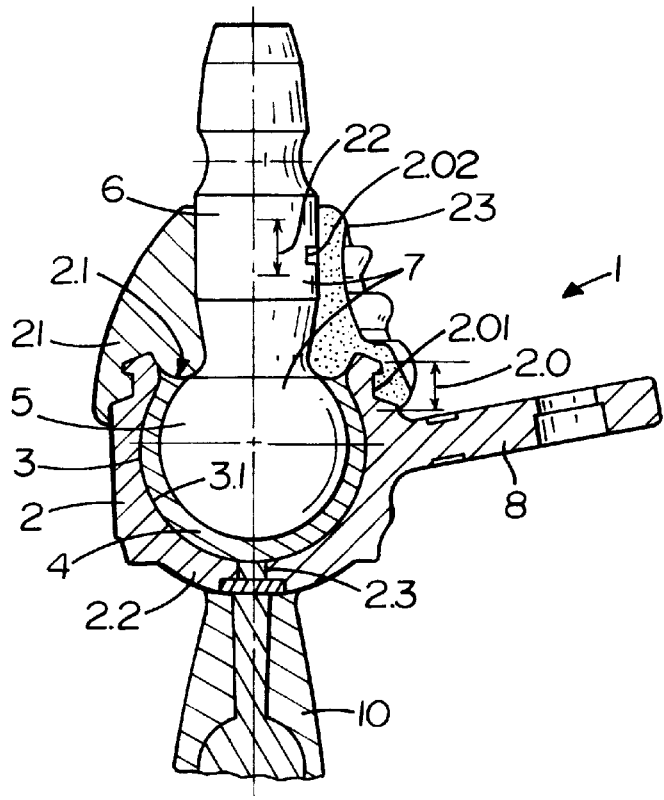
FIG. 1 shows one embodiment of the bottom of the injected bearing shell.

In the drawings in FIG. 1 the ball joint is labelled 1. It has a ball joint housing 2 which is provided with a recess 3 which is accessible via an opening 2.1. In the recess 3 there is an injected bearing shell 4 of plastic with a low coefficient of friction. The bearing surface of the bearing shell 4 is used to support a ball 5 which is provided on the shaft 6 of a ball pivot. On the ball joint housing 2 there is an attachment means in the form of a flange 8 which projects laterally.

Production of the ball joint 1 proceeds such that the ball pivot 7 with its ball 5 is inserted in the recess 3 in its intended end position and then the opening 2.1 is closed with a mold tool plunger which is not shown. On the side opposite side 2.1 the closed bottom 2.2 of the ball joint housing 2 is provided with a gate 2.3 via which the plastic mass is injected into the remaining cavity between the inside wall 3.1 of the recess 3 and the ball 5 by a gate plunger 10 of an injection or injection molding tool which is not detailed. This forms the bearing shell 4.

For good anchoring of the bearing shell 4 in the recess 3 its inside wall 3.1 is roughened, fluted, peripherally grooved, or made adherent in some otherwise suitable manner. In particular in the production of the ball joint housing 2 using the known metal casting processes the resulting rough surface can be left unmachined, since high precision is not critical in the production of the inside wall 3.1

A metal, preferably steel or cast steel, is used as the material for the ball joint housing 2. Plastic or aluminum can also be used. For the bearing shell 4 a plastic is used which can be deformed thermoplastically or duroplastically and which then sets, and which has low sliding friction. Advantageous plastics include polyethylene, polypropylene, polyoxymethylene, polyether sulfone, polyetheretherketone, or polyamide. But other suitable plastics can also be used.

The material of the bearing shell 4 can also consist of foamed plastic. This foamed plastic can be produced for example such that roughly up to 20% propellant is added to the material which is processed in the injection or injection molding process. This yields an open-pore or closed-pore plastic foam body which in spite of the pores still has sufficiently high strength and therefore ensures a long service life. This plastic foam body in the open-cell version moreover has the property of being able to hold lubricant so that a ball joint 1 with permanent lubrication can be obtained.

As claimed in the invention the area sealed in the past by a collar or bellows between the shaft 6 and a peripheral groove 2.01 provided in the upper area 2.0 of the ball joint housing 2 is surrounded by an elastic jacket 21 which consists of cross-linked and/or uncrosslinked elastomer, which fills the entire cavity, and which is molded on. The jacket 21 runs at least out of the middle area 22 of the shaft 6 into the groove 2.01 or to underneath the groove 2.01. When the elastic jacket 21 is molded on, the plastic is molded into the groove 2.01. The material for the jacket 21 can preferably be plastics such as polyurethane, polyester or silicone or plastics based on polyurethane, polyester or silicone. Since the usable plastics adhere well to the material of the ball joint housing 2, circlips or spiral lock washers can be completely abandoned.

Preferably the jacket 21 consists of closed-cell and/or open-cell material as is shown using the partial section through the jacket 21 shown on the right side of FIG. 1. In this way more favorable loading of the material for large angular deflections of the shaft 6 is achieved and the service life of the jacket 21 is prolonged.

In particular the foamed material is made open-cell and on its outer surface has a closed outer skin 23. Under mechanical stress this causes higher strength. In addition, in this material the cells can be used as a lubricant reservoir. For example grease or oil or a grease-oil mixture can be used as the lubricant.

Advantageously the outer wall or outer skin 23, similarly to known bellows collars, can be made annularly corrugated, as is shown on the right side of the ball joint 1 of FIG. 1. In this way the tensile and compressive loads of the material of the jacket 21 with major deflection of the shaft 6 and the service life of the jacket and thus also the slide bearing are prolonged.

It should be mentioned that instead of a peripheral groove 2.01 there can also be several groove sections and/or depressions and/or notches in which the material of the jacket 21 can be securely anchored. In addition, the invention can also be used in other constructions of ball joints. For example there need not be any plastic shell 4 or the ball joint housing 2 can also be made in some other way, for example such that its bottom has an opening for insertion of the ball pivot which is sealed with a pressure plate which is attached by crimping or rolling in one edge of the ball joint housing 2. Nor it is important for operation of the invention what material comprises the ball joint housing 2 and/or the ball pivot 7. These materials can be freely selected depending on the load which occurs.

Use of the invention in ball joints 1 of the type shown in FIGS. 2 to 5 in which the mold plunger is used in a special way for producing of plastic bearing shell 4 is advantageous.

Figure 2:
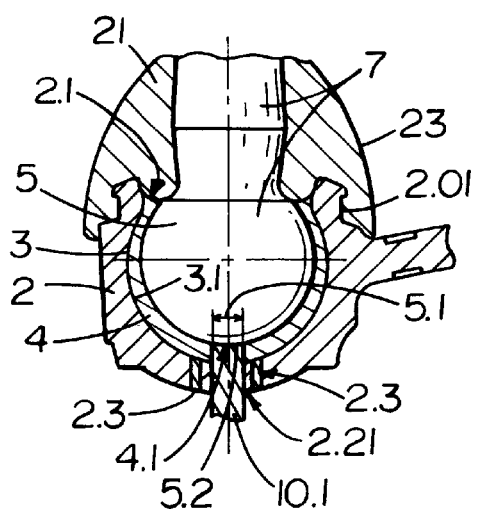
FIGS. 2 and 2a through 5 shows other advantageous embodiments of a ball joint.

According to the embodiment shown in FIG. 2, in the bottom 2.2 of the ball joint housing 2 on the spherical cap section 5.1 opposite the ball pivot 7 in the production of the bearing shell 4 a mold plunger 10.1 movably guided in the gate plunger 10 is pressed against the ball 5 through an opening 2.21 made as a hole.

Figure 3:
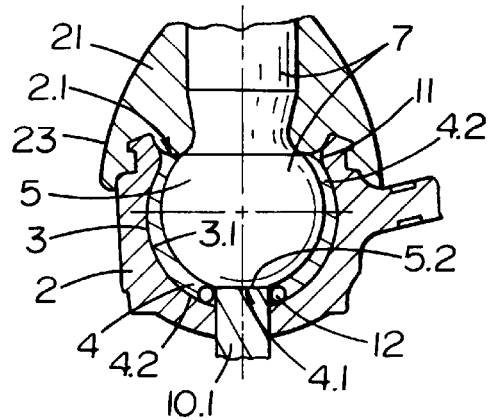

One special advantage of the use of the mold plunger 10.1 is apparent from FIGS. 2 and 3. In the balls 5 shown there the spherical cap section 5.1 is not made completely as a spherical surface, but forms for example a surface 5.2 more or less flat or one conical to the inside, optionally staggered or indented. This occurs in the production of the ball body 5 in general when the ball pivot 7 with the ball 5 after machining is separated from the raw material, especially is cut off by turning. If here the bearing shell 4 were to be injected without the mold plunger 10.1, the ball 5 could no longer be turned or swivelled at all or only with difficulty. If however the opening 2.21 is arranged and made and also the mold plunger 10.1 is made and arranged such that it covers at least the surface 5.2 and tightly surrounds it, then this effect no longer occurs. This surface area is then no longer spit out at the same time so that the ball 5 can be easily moved to all sides in the bearing shell 4, even if the spherical surface is not fully formed. Use of this measure therefore makes the cut-off process or the like noncritical so that the ball 5 and also the ball joint 1 can be produced efficiently and economically.

Figure 2A:
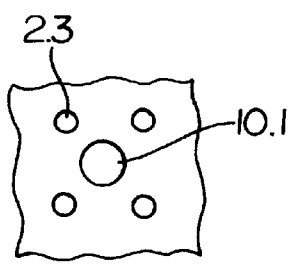

In addition, the mold plunger 10.1 among others ensures good fixing of the ball 5 in the mold tool. When the mold plunger 10.1 is used, preferably at least one or even several gate marks 2.3 are attached laterally from the mold plunger 10.1 as is shown schematically in FIG. 2a using four gate marks 2.3.

According to the embodiment shown in FIG. 3, by means of the corresponding molding tools one or one each sealing O-ring 11 or 12 of rubber or an elastomer can be inserted or molded in at the same time in the production of the bearing shell 4. This or they seal the respective end edge 4.2 of the bearing shell 4 to the outside.

The opening 4.1 obtained by the mold plunger 10.1 in the bearing shell 4 can be closed by an inserted, forced or cast in seal of elastomer or a thermoplastic or duroplastic, also in the form of a closed-pore or open-pore foam. To improve the sliding properties of the ball 5 in the bearing shell 4 when using open-cell foam it can be impregnated with a lubricant, for example an oil and/or grease.

Figure 4:
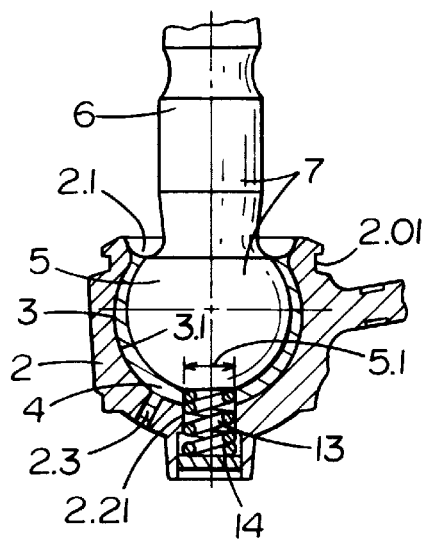

According to FIG. 4, at least one compression spring 13 of plastic or especially metal, for example, in the form of a helical spring or a plate spring, can be placed in the opening 2.21. It or they can be secured by a fixing element 14 which can be permanently inserted, for example a sealing plug which is used as a seal, of plastic or metal, and can be prestressed against the spherical cap section 5.1. The compression spring 13 ensures the absence of play of the ball 5 and prevents rattling in case of the wear which has occurred over the service life of the bearings. The fixing element 14 can be snapped, pressed, welded, cemented, and/or crimped into the bottom 2.2. It can also have an outside thread, possibly additionally, and for example according to FIG. 4 can be made as a screw-in disk.

Figure 5:
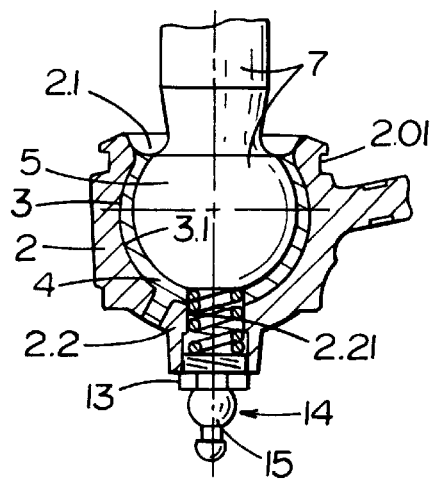

The opening 2.21 can also be filled with oil and/or grease when compression springs 13 are used. Feasibly the fixing element 14 can consist of an especially screw-in lubricating nipple 15, as is shown in FIG. 5. The lubricating nipples 15 and the fixing element 14 can also be made such that the lubricating nipple 15 can be screwed into the fixing element 14.

Finally it can be considered advantageous that the jacket 21 be made of two components, i.e. of essentially inelastic materials, for example polyamide, in the area of the peripheral grooves 2.01, 2.02 or the groove sections or/and the depressions and/or the notches and of an elastomer in the other areas of the jacket 21.

Even if in the embodiment of FIG. 1 two grooves, especially peripheral grooves 2.01 and 2.02, are shown, embodiments can also be used to advantage which have only one of the two grooves 2.01 or 2.02 or no groove at all.

What is claimed is:

1. Ball joint comprising a ball joint housing, a ball pivot having a shaft and a ball connected to the shaft, said ball being pivotally mounted in a recess of the ball joint housing, and an elastic seal between the shaft and the ball joint housing, wherein the seal is a molded-on jacket of an elastomer material which has been formed in situ on said shaft.

2. Ball joint as claimed in claim 1, wherein the jacket is made of a foam material with a tight outside skin.

3. Ball joint as claimed in claim 1, wherein the ball joint housing has at least one of a peripheral groove, groove sections, depressions and notches in an upper exterior region; wherein the jacket extends at least as far as the at least one of a peripheral groove, groove sections, depressions, and notches; and wherein said at least one of a peripheral groove, groove sections, depressions and notches are filled with the material of the jacket.

4. Ball joint as claimed in claim 3, wherein the jacket is made of two components, a first of the two components being an essentially inelastic material which is located in the area of the at least one of a peripheral groove, groove sections, depressions and notches and a second of the two components being an elastomer in the other areas of the jacket.

5. Ball joint as claimed in claim 1, wherein at least one of a peripheral groove, groove sections, depressions and notches is provided on the shaft of the ball pivot.

6. Ball joint as claimed in claim 1, wherein the elastomer material is polyurethane or is based on polyurethane.

7. Ball joint as claimed in claim 1, wherein the elastomer material is polyester or is based on polyester.

8. Ball joint as claimed in claim 1, wherein the elastomer material is silicone or is based on silicone.

9. Ball joint as claimed in claim 1, wherein the elastomer material of the jacket comprises at least one foamed polymer material.

10. Ball joint as claimed in claim 9, wherein the foamed polymer material is an open-cell molding with a closed outside skin.

11. Ball joint as claimed in claim 10, wherein the foamed polymer material has cells that are at least partially filled with a lubricant.

12. Ball joint as claimed in claim 1, wherein the jacket has an outside surface that is annularly corrugated.

13. Ball joint as claimed in claim 1, wherein the ball in the recess of the ball joint housing is supported in an inserted or injected ball shell of plastic.

14. Ball joint as claimed in claim 1, wherein said elastomer material is adhered to said ball joint housing as a result of having been molded thereon.

15. Ball joint as claimed in claim 1, wherein said jacket is internally matched to the shape of the ball shaft as a result of having been molded thereon.

* * * * *